(12) United States Patent
Handschuh et al.

(10) Patent No.: US 9,321,211 B2
(45) Date of Patent: Apr. 26, 2016

(54) BLOW MOLDING MACHINE WITH BLOW MOLDING PISTON WITH OBLIQUELY ARRANGED CONNECTING LINES

(71) Applicant: Krones AG, Neutraubling (DE)

(72) Inventors: Eduard Handschuh, Donaustauf (DE); Florian Geltinger, Donaustauf (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/490,671

(22) Filed: Sep. 19, 2014

(65) Prior Publication Data
US 2015/0099029 A1    Apr. 9, 2015

(30) Foreign Application Priority Data

Oct. 4, 2013  (DE) .......................... 10 2013 111 029

(51) Int. Cl.
*B29C 49/12* (2006.01)
*B29C 49/58* (2006.01)
*B29C 49/06* (2006.01)

(52) U.S. Cl.
CPC ................. *B29C 49/58* (2013.01); *B29C 49/12* (2013.01); *B29C 49/06* (2013.01); *B29C 2049/129* (2013.01); *B29C 2049/5803* (2013.01); *B29C 2049/5858* (2013.01)

(58) Field of Classification Search
CPC ............ B29C 49/58; B29C 2049/5803; B29C 2049/5858; B29C 2049/1242; B29C 49/12
See application file for complete search history.

(56) References Cited

U.S. PATENT DOCUMENTS

| 3,993,427 | A | * | 11/1976 | Kauffman | B29C 49/58 264/523 |
|---|---|---|---|---|---|
| 4,039,641 | A | * | 8/1977 | Collins | 264/28 |
| 4,043,735 | A |  | 8/1977 | Farrell |  |
| 6,485,669 | B1 | * | 11/2002 | Boyd et al. | 264/521 |
| 6,576,171 | B1 | * | 6/2003 | Devenoges | B29C 49/12 264/40.1 |
| 6,905,326 | B2 | * | 6/2005 | Voth | B29C 49/58 425/529 |
| 7,674,108 | B2 | * | 3/2010 | Lemaistre | B29C 49/42 425/535 |
| 2006/0165839 | A1 | * | 7/2006 | Wohlgemuth et al. | 425/525 |
| 2010/0252945 | A1 | * | 10/2010 | Eudier | B29C 49/12 264/40.5 |

(Continued)

FOREIGN PATENT DOCUMENTS

DE      4327363 A1 *  2/1995
DE  102010052903 A1 *  6/2012

(Continued)

OTHER PUBLICATIONS

German Search Report for German Patent Application No. 10 2013111 029.0 dated May 15, 2014.

*Primary Examiner* — Robert B Davis
(74) *Attorney, Agent, or Firm* — Oppedahl Patent Law Firm LLC

(57) ABSTRACT

An apparatus (1) for the transforming of plastics material preforms (10) into plastics material containers with a blow molding nozzle (2) arranged on a blow molding piston (14) extending in a predetermined longitudinal direction (L), in order to act upon these plastics material preforms with a gaseous medium for the expansion thereof, with an attachment device in order to supply the gaseous medium to the blow molding nozzle (2), and with at least one connecting line (22) which conveys the gaseous medium from the attachment device to the blow molding nozzle. According to the invention at least one portion of this connecting line (22) extends obliquely with respect to the longitudinal direction (L).

28 Claims, 3 Drawing Sheets

(56) References Cited

U.S. PATENT DOCUMENTS

2010/0285169 A1* 11/2010 Blochmann .................. 425/535
2011/0062368 A1* 3/2011 Blochmann .................. 251/356
2012/0141621 A1* 6/2012 Voth et al. .................... 425/149

FOREIGN PATENT DOCUMENTS

| GB | 2195287 | 4/1988 |
|---|---|---|
| WO | 2011076167 | 6/2011 |
| WO | WO 2013/079522 A1 * | 6/2013 |

* cited by examiner

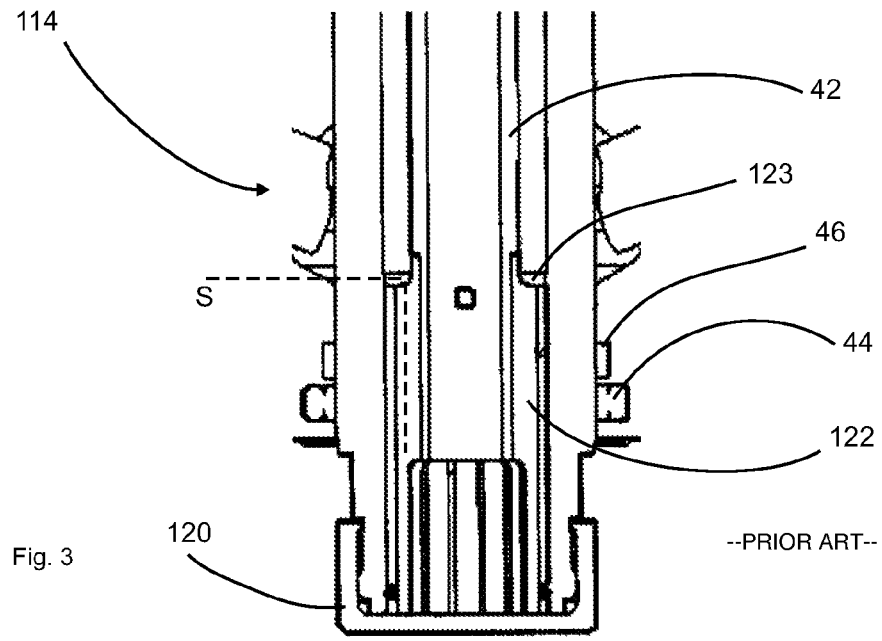
Fig. 3  --PRIOR ART--
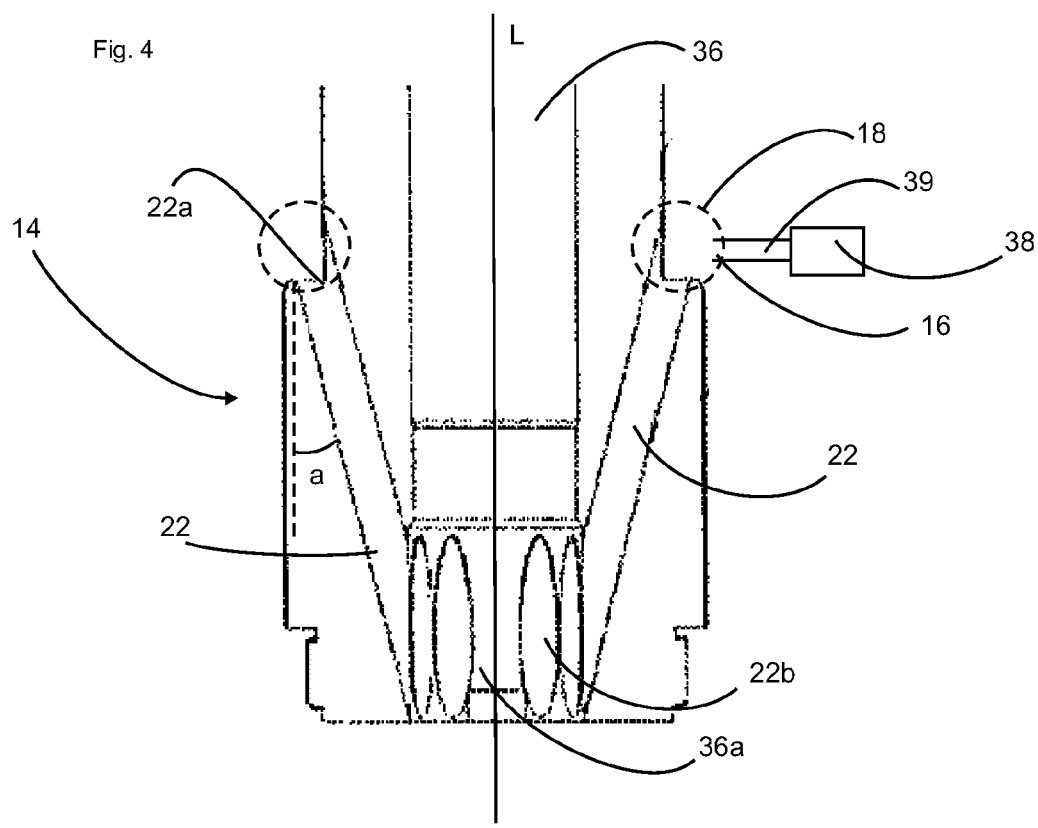
Fig. 4

BLOW MOLDING MACHINE WITH BLOW MOLDING PISTON WITH OBLIQUELY ARRANGED CONNECTING LINES

BACKGROUND

The present invention relates to an apparatus for transforming plastics material preforms into plastics material containers. Such apparatuses have been known from the prior art for a long time. In this case it is customary for heated plastic preforms to be supplied to this apparatus and expanded by being acted upon with compressed air to form plastics material containers or plastic bottles respectively. For this purpose, a blow molding piston with a blow molding nozzle is placed on the plastics material preform and it acts upon the latter with compressed air. It is customary for a stretching rod also to be introduced through this blow molding piston or the blow molding nozzle respectively into the interior of the plastics material preform in order to stretch the latter in the longitudinal direction thereof.

In this case it is known for lines, which convey the gaseous medium—starting from a reservoir for example—to the blow molding nozzle, to be provided inside this blow molding piston. In this case these lines usually extend in part in a vertical direction and in part in a horizontal direction. These lines in the prior art therefore usually have bends, for example 90° bends, which can be obstructive for the air flow. In addition, this arrangement leads to an increased dead space. In particular, in the case of sterile arrangements, germs can be formed or settle respectively in the regions of these bends. A dead space is to be understood below as being that space which, in particular, is filled with a gas and which is used exclusively for conveying a medium, in particular a blowing air and, in particular, terminates at a valve element such as for example a piston. The gas, situated in the dead space, can thus not be used completely for the expansion of the plastics material preforms. This is why efforts are made to reduce the dead space as much as possible.

It is therefore desired to improve the applying of the plastics material preforms during the expansion procedure thereof with a gaseous medium, and for example with blow molding air.

SUMMARY OF THE INVENTION

An apparatus according to the invention for the transformation of plastics material preforms into plastics material containers has a blow molding nozzle arranged on a blow molding piston extending in a predetermined longitudinal direction, in order to act upon these plastics material preforms with a gaseous medium for the expansion thereof. Furthermore, the apparatus has an attachment device in order to supply the gaseous medium to the blow molding nozzle. In addition, the apparatus has a connecting line in order to convey the gaseous medium from the attachment device to the blow molding nozzle.

According to the invention at least one portion of this connecting line extends obliquely with respect to the aforesaid longitudinal direction.

It is advantageous for the apparatus to have a drive device in order to deliver the blow molding nozzle to the plastics material preform for the purpose of the expansion.

Whereas—as mentioned above—in the prior art usually connecting lines are provided, which extending vertically and horizontally, it is proposed here that an oblique connecting line should be provided. As a result of the provision of this connecting line, excessively sharp bends, for example 90° bends, can be avoided and, in this way, the air guidance can be simplified. It is advantageous for the aforesaid connecting line to be produced without bends. In other words, when considered mathematically, it is possible for a precisely defined tangent to be applied to each point of the connecting line. It would also be possible, however, to provide bends, these not exceed a specified angular dimension, for example the bends should bend by not more than 60°, preferably by not more than 40°, and preferably by not more than 30°. In this way, as mentioned above, it is possible to improve the supply of the blow molding air.

In the case of a further advantageous embodiment a distance between the connecting line and a geometric longitudinal axis of the blow molding piston increases in a direction of the longitudinal axis which extends away from the plastics material preform to be expanded.

In the case of a further advantageous embodiment the apparatus has a valve device for supplying the blow molding nozzle with the gaseous medium. It is advantageous for the apparatus to have a valve block which has a plurality of valves. In this way, the plastics material preform can be supplied with a multiplicity of pressure levels during its expansion, for example at a preliminary blow molding pressure (between 6 [and] 10 bar), at an intermediate blow molding pressure (between 10 and 20 bar) and at a completion blow molding pressure (between 25 and 40 bar). All the pressure levels can be supplied by way of the aforesaid connecting line in this case.

The connecting device can be any device which allows the supply of a medium, in particular a gaseous medium and in particular the blow molding air—for example starting from a reservoir—to the blow molding nozzle. A (further) connecting line, which forms a flow connection to the aforesaid connecting line, can therefore be understood as being an attachment device.

In the case of a further advantageous embodiment the apparatus has a blow mold which in turn forms a cavity, inside which the plastics material preform is capable of being expanded or is expanded respectively to form the plastics material container. This blow mold preferably has in this case a plurality of blow mold parts, for example two lateral parts which in turn are arranged on blow mold holders. These blow mold holders can preferably be pivoted apart and together for opening and closing the blow mold. It is therefore advantageous for drive devices to be provided in order to carry out these pivoting movements.

In the case of a further advantageous embodiment the apparatus has a sterile room, inside which the plastics material preforms are expended to form the plastics material containers. This sterile room is preferably sealed off in this case from a non-sterile environment. The apparatus according to the invention is suitable, in particular, for applications of this type with a sterile room, since—as mentioned above—as a result of the oblique guidance of the connecting line bends can be avoided or the angles of these bends can be reduced respectively and therefore the risk of germs settling in these bends can also be reduced.

In the case of a further advantageous embodiment the blow molding piston is produced from a material which is selected from a group of materials which contains steel, stainless steel, coated aluminium and the like. In particular, however, for sterile applications, it is also possible for the blow molding piston or component parts of the blow molding piston to be built up from plastics materials such as PEEK, PTFE or compounds of these plastics materials.

In the case of a further advantageous embodiment the portion of the connecting line, specified above, extends at an angle with respect to the longitudinal direction, which is between 5° and 70°, preferably between 5° and 50°, preferably between 5° and 40° and in a particularly preferred manner between 5° and 30°. An advantageous longitudinal dimension for the blow molding piston or the portion of the blow molding piston in which the connecting line is formed respectively can be produced by means of these angular dimensions. It is preferable for this angle also to be formed with respect to a stretching rod described in still greater detail below.

In the case of a further advantageous embodiment the portion extends in a straight line or optionally with a slight curvature. The straight extension has the advantage that the connecting line can be produced more easily, for example by boring, in the course of the production.

In the case of a further advantageous embodiment the apparatus has a rod-like body which is capable of being introduced into the plastics material preforms and which is passed through at least one portion of the blow molding piston and/or the blow molding nozzle. It is thus advantageous for the blow molding air to be introduced, for the expansion of the plastics material preforms between the stretching rod and the estuaries of the plastics material preforms to be introduced into the latter.

In the case of a further advantageous embodiment the apparatus has a plurality of the connecting lines, specified above, which convey the gaseous medium from the attachment device to the blow molding nozzle. It is advantageous in this case for a plurality of these connecting lines, and preferably all the connecting lines, to extend obliquely to the aforesaid longitudinal direction. It is advantageous in this case for these connecting lines to extend uniformly obliquely. When considered as a whole, these connecting lines thus form a tapered shape which is preferably enlarged in the direction away from the plastics material preform. In other words these connecting lines approach the stretching rod in the longitudinal direction to the plastics material preform. This stretching rod thus extends preferably inside the individual connecting lines. In this case it is possible for this plurality of connecting lines to be arranged star-shaped.

In the case of a further advantageous embodiment the aforesaid connecting lines are arranged in a circumferential direction around a longitudinal axis of the blow molding piston or in a circumferential direction around the aforesaid rod-like body respectively. It is advantageous in this case, as stated, for these connecting lines to have no bends. In particular, consideration is given to arrange the connecting lines at regular intervals around the circumference of the blow molding piston. Preferable there are fewer than 15 connecting lines, and in a particularly preferred manner fewer than 12 connecting lines, provided on the blow molding piston.

It is preferable for the connecting lines to be arranged star-shaped around the stretching rod. These connecting lines can in this case be appropriate bores in the valve block.

It is advantageous for a collecting space to be provided, out of which the individual connecting lines can be supplied with the gaseous medium. This collecting space can preferably be designed in this case in the form of an annular line or, in a more general manner, in the form of a circumferential line, from which the individual connecting lines branch off respectively. The attachment device in turn can supply a gaseous medium to the circumferential connecting line in this case. It would also be possible to provide several attachment devices, which could supply, for example, compressed air at different pressure levels to the collecting space.

The aforesaid annular space can be part of an attachment device in this case. The attachment device can be designed in such a way that over the attachment device, for example, the annular space is supplied with the gaseous medium by a valve supply.

It is advantageous in this case for these connecting lines to be designed in such a way that (with the exception of the blow molding piston itself) they cross no further components, in order also to prevent in this way areas from being formed in which germs can settle more easily. It is advantageous therefore for the connecting lines to extend exclusively inside the blow molding piston.

This blow molding piston can be designed in one piece. It is preferable, however, for the blow molding piston to be designed in several parts, and in particular in two parts. These two parts are preferably bored jointly during the production. It is preferable for a first part of the blow molding piston to be capable of being inserted into a second part of the blow molding piston. It is preferable, in this way, for a part of the blow molding piston to have a receiving area for receiving a portion of the other part of the blow molding piston.

In the case of a further advantageous embodiment these connecting lines have in each case inlet openings and, as stated above, it is preferable provided an annular space, which supplies these inlet openings preferably jointly with the gaseous medium. Preferably, these inlet openings can have an elliptical cross-section, for example.

In the case of a further advantageous embodiment the apparatus has at least one valve or at least one valve device respectively, in order to control the supply of the gaseous medium by way of the connecting lines. It is advantageous, as mentioned above, for a plurality of such valve devices to be provided. In this case it is also possible for a valve to be provided which allows the removal of a gaseous medium from the plastics material preform, for example after the complete expansion of the latter.

The provision of this plurality of valves allows the supply of blow molding air at different pressures, for example at a preliminary blow molding pressure, at an intermediate blow molding pressure and at a complete blow molding pressure. In addition, a valve for discharging the gaseous medium out of the plastics material preforms or, in particular, the plastics material containers, blow molded from the latter respectively, can be provided. In this way, a first valve can control the supply of a preliminary blow molding pressure, a second valve the supply of an intermediate blow molding pressure and a third valve the supply of a complete blow molding pressure.

In the case of a further advantageous embodiment the valve is capable of being associated in a flow connection with the connecting lines (in particular by way of a supply line), in which case a cross-sectional area of these connecting lines is at least as large as a cross-sectional area of the supply line. In addition or as an alternative, it would also be possible for an (equivalent) cross-sectional area of the connecting lines to be larger than or equal to the cross-sectional area of a vent valve. In the case of a further advantageous embodiment it would also be possible for a cross-sectional area (and/or a diameter) of at least one connecting line, preferably of several connecting lines and in a particularly preferred manner of all these connecting lines, to be larger than a cross-sectional area (and/or a diameter) of a supply line or a discharge line. It is preferable for a cross-sectional area (and/or a diameter) of a discharge line, which is used for the removal of the blow molding air from the plastics material container, to be larger than the cross-section (and/or a diameter) of a supply line, which supplies the blow molding air to the plastics material pre-form.

In addition, it would also be possible for all the bores or connecting lines respectively, from the entry into the blow molding piston, to the course towards the sealing element, to approach the stretching rod radially.

In this case it can be provided that this aforesaid supply line is arranged at an outlet of the valve and extends, for example, in a direction different from the connecting line. It is advantageous, however, for a cross-section of this supply line, to be smaller than or equally large as the cross-section of the connecting line. This ensures that the supply of air to the plastics material preforms is not obstructed or throttled by the connecting line or by this cross-section itself respectively.

In the case of a further advantageous embodiment a guide body is arranged between the rod-like body and the blow molding piston.

This guide body is used in this case for guiding a relative movement between the rod-like body and the blow molding piston. In particular, this guide body is a guide sleeve. This guide sleeve is preferably produced from a plastics material in this case.

The present invention further relates to a blow molding piston for acting upon plastics material preforms with a gaseous medium. This blow molding piston has a main body which has in the interior thereof a continuous cavity which extends in a longitudinal direction of the blow molding piston and through which a rod-like body, and in particular a stretching rod, is capable of being guided, as well as a plurality of connecting lines which are suitable for conveying a gaseous medium. According to the invention each of these connecting lines is arranged around this cavity in a circumferential direction and extends obliquely with respect to the longitudinal direction.

In the case of a further preferred embodiment the blow molding piston has a connecting device in order to arrange a blow molding nozzle in a fixed but releasable manner on the blow molding piston. In the case of a preferred embodiment at least one connecting line, and preferably all the connecting lines, leads or lead to the cavity. It is preferable for the connecting lines to lead to the cavity by way of an elliptical, elongate or kidney-shaped opening. It is preferable for the connecting lines to be arranged uniformly around the cavity. It is preferable for the cavity in at least one area to have a larger cross-section than in another area. In other words, a cross-section of this cavity changes at least once along the longitudinal direction.

It is preferable for the cavity to have an enlarged cross-section in that area in which the connecting lines lead to it. In this way, the supply of the blow molding air past the stretching rod into the estuary of the plastics material preforms can be facilitated. A collecting space—in particular annular—for the blow molding air, which surrounds the stretching rod, can likewise be formed by this enlarged area of the cavity. The gaseous medium can be conveyed further by way of this collecting space to the plastics material preforms for the expansion thereof.

In the case of a further preferred embodiment at least one of these connecting lines has an inlet opening, which extends at least in part in a plane, which extends tangentially to the main body.

It is preferable for at least one inlet opening of at least one connecting line also to extend in a plane to which the longitudinal direction is at a right angle. It is preferable for at least one inlet opening to extend in two planes at a right angle to each other.

In the case of a further preferred embodiment the main body has a first portion with a first external cross-section, and a second portion with a second external cross-section which differs from the first external cross-section, in which case these portions adjoin each other in a transition area to each other. It is preferable for at least one inlet opening to be situated in this transition area.

It is preferable for at least one of these portions to have a circular external cross-section and it is preferable for both of the portions to have in each case a circular external cross-section. It is preferable for the connecting lines to be situated in the portion with the larger external cross-section. It is preferable for the portion with the larger external cross-section to be situated closer to a blow molding nozzle to be arranged on the blow molding piston. In the case of a further preferred embodiment the first portion and the second portion merge into each other in a stepped manner. It is preferable for a third portion of the main body to be arranged on the portion with the larger external cross-section, in which case this third portion also has the connecting device for the arrangement of the blow molding nozzle.

In the case of a further preferred embodiment the connecting lines extend in a straight line inside the main body. It is advantageous for the connecting lines to have outlet openings at one of their ends. It is advantageous for the connecting lines to be bores. It would also be possible, however, for the connecting lines to be made curved (at least sectionally or completely).

DESCRIPTION OF THE DRAWINGS

Further advantages and embodiments are evident from the accompanying drawings. In the drawings

FIG. 3 is an illustration of a blow molding piston according to the prior art;

FIG. 4 is a partial illustration of a blow molding piston according to the invention.

DETAILED DESCRIPTION

Figure 1:
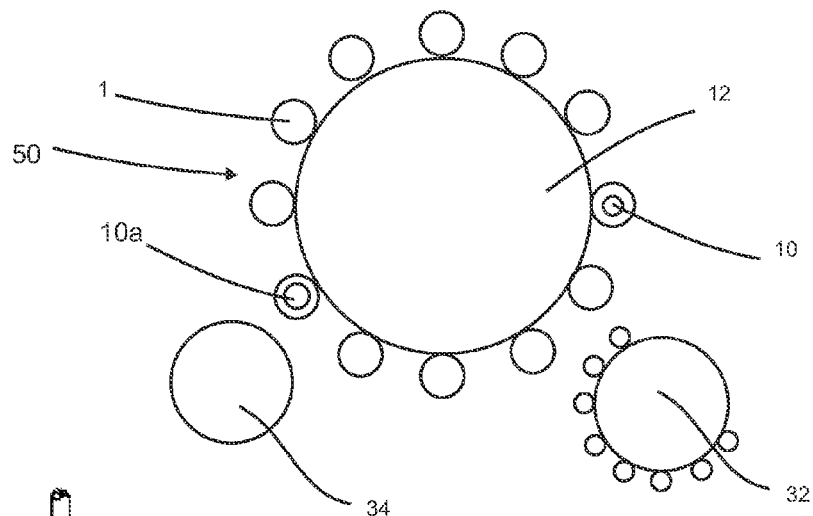
FIG. 1 is a diagrammatic illustration of an arrangement according to the invention for the transforming of plastics material preforms into plastics material containers.

FIG. 1 is a diagrammatic illustration of an arrangement 50 for the transforming of plastics material preforms 10 into plastics material containers 10a. In this case the plastics material preforms 10 are supplied to a plurality of transforming stations 1 by way of a supply device 32, such as for example a supply star wheel. These shaping stations 1 are arranged on a rotatable carrier in this case. During their conveying along the conveying path P the plastics material preforms 10 are expanded to form the plastics material containers 10a. The plastics material containers expanded in this way are removed from the conveying star wheel 12 again by way of a removal device 34 and are conveyed further. The supply device and/or the removal device can in each case be conveying star wheels.

Figure 2:
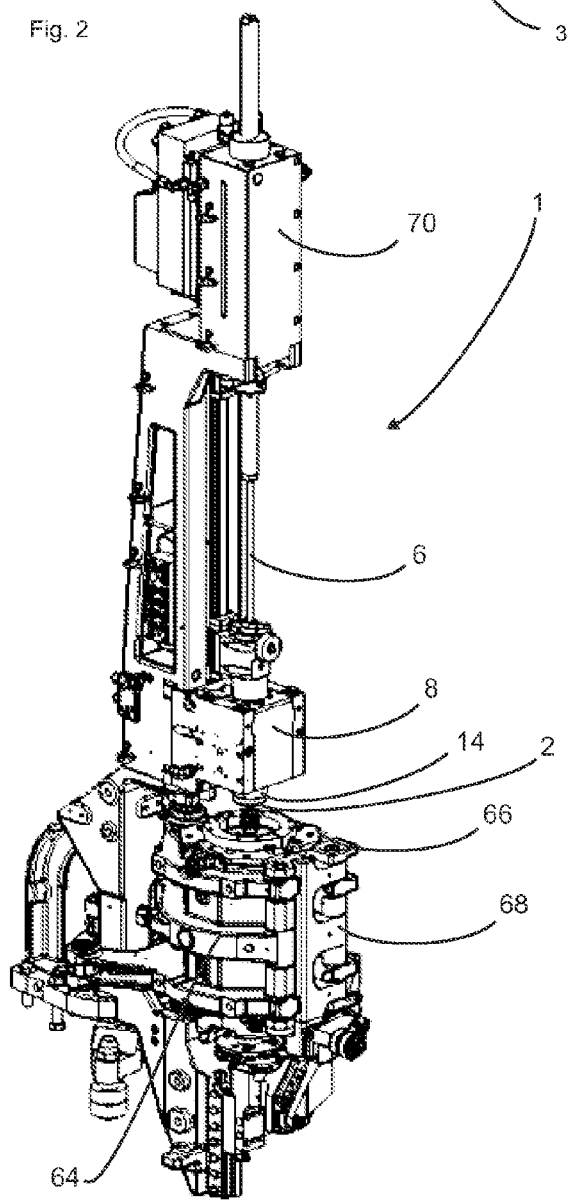
FIG. 2 is an illustration of a transforming station according to the invention.

FIG. 2 is an illustration of a single transforming station 1. This transforming station 1 has in this case a blow molding device in which two lateral parts 64 and 66 are shown here, which can be pivoted with respect to each other about an axis which is at a right angle to the conveying path of the plastics material containers. As a result of this procedure it is possible for plastics material preforms to be introduced into this blow molding arrangement and to be expanded by means of blow molding air. The reference number 68 designates a locking device for locking the two parts of the blow mold.

For the purposes of expansion a blow molding nozzle 2 is set on the plastics material preforms or a part of the blow mold so that it can be acted upon with compressed air in this way. This blow molding nozzle 2 is arranged in this case on a blow molding piston 14 (shown only in part). The reference number 8 designates a valve block in which a plurality of valves is arranged, in order to control the stressing of the plastics material preforms at different pressure levels. In contrast to the blow molding piston and the blow molding nozzle, the valve block preferably does not move in production operation. In principle, however, it would be possible for the valve block to move jointly with the components named above or with other components respectively.

The reference number 6 designates a stretching rod which is capable of being introduced into the interior of the plastics material preforms in order to stretch the latter in the longitudinal direction thereof during the expansion thereof. The reference number 70 designates a respective drive, such as a linear motor, which controls the movement of the stretching rod in this longitudinal direction L. In addition, it is also possible for the blow molding piston 14 likewise to be moved in this longitudinal direction L, which can be carried out for example by means of guide curves.

FIG. 3 is an illustration of a blow molding piston 114 according to the prior art. A blow molding nozzle is not provided in this case, but instead a cap 120 which is provided in the delivery as a substitute for the blow molding nozzle. A connecting line 122, which extends in the vertical direction or in the longitudinal direction L respectively, may be seen in the interior of the blow mold. A second portion 123 extends in the horizontal direction. The reference letter S designates the flow path of the blow molding air. As mentioned above, bends can occur inside the connecting line in this case.

In addition, however, each of these blow molding pistons 114 also has a guide sleeve 42 which is used for guiding the stretching rod 6. It is pointed out that this guide sleeve is also advantageous in the arrangement of the blow molding nozzles according to the invention. It is advantageous for this guide sleeve to be produced from a plastics material and to be inserted into the blow molding piston. The stretching rod 6, which preferably consists of steel, can thus be guided in such a way that the blow molding piston 114 and the stretching rod 6 do not rest against each other.

The reference number 44 designates a seal and the reference number 46 designates a further guide device. In this way, the blow molding piston 114 (and in a corresponding manner also the blow molding piston according to the invention) can be guided and also moved inside the valve block 8 shown above.

FIG. 4 is an illustration of a blow molding piston 14 according to the invention. It is evident in this case that the connecting lines 22 do not extend vertically or in the direction L respectively, but obliquely thereto. The angle a at which these connecting lines extend can, as mentioned above, preferably be between 5° and 50° with respect to the longitudinal direction L. It is evident that in this case a plurality of connecting lines 22 are arranged extending around the longitudinal direction L. These connecting lines have an upper supply opening 22a and a lower opening or removal opening 22b respectively, which in this case is made elliptical and leads to a collecting portion 25 of the blow molding piston 14.

An annular channel or annular space 18 respectively, which supplies the individual connecting lines 22 with the gaseous medium, is shown in broken lines or diagrammatically respectively, in this case. This annular channel or annular space 18 respectively, can in turn have an attachment device 16 or preferably a plurality of attachment devices 16. In order to keep the dead space as small as possible it is additionally advantageous for the annular channel or also the valves respectively, to be arranged as close as possible to the blow molding nozzle or the plastics material container respectively. The reference number 36 designates a cavity which is used for receiving the stretching rod. In addition, the openings 22b of the connecting lines 22 lead to this cavity. The reference number 38 designates a valve device which controls the supply of the gaseous medium to the annular space 18 and thus also to the blow molding nozzle. The reference number 39 designates a connecting line which extends from the valve device 38 to the annular space 18.

Figure 5:
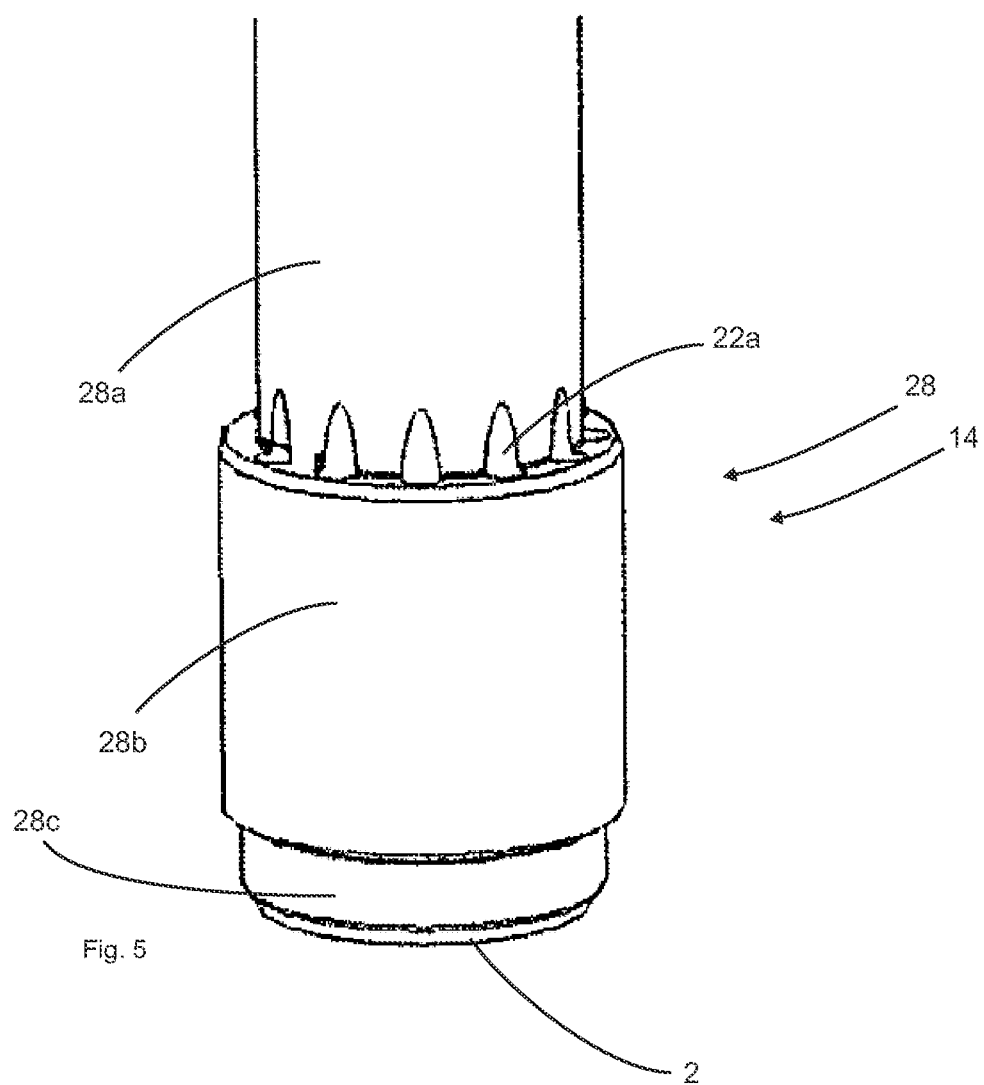
FIG. 5 is a further illustration of a blow molding piston according to the invention.

FIG. 5 is a further illustration of a blow molding piston 14. A main body 28 of this blow molding piston, is evident in this case, inside which the oblique connecting lines extend, as mentioned above. In addition, the blow molding nozzle 2, which can be positioned on the plastics material preform, is again illustrated here. The air channels 22 are, as mentioned above, arranged preferably star-shaped (around the blow molding piston) in this case.

In other words the connection paths for the fluid are arranged star-shaped around the stretching rod between the preferably stationary valve block and the preferably moved sealing element (i.e. the blow molding nozzle).

In addition, it is possible for a guide sleeve (not shown) to be inserted into the space inside the blow molding piston 14 (cf. FIG. 4). On account of the oblique arrangement of the connecting lines 22 shown here, bends in the connecting line can be avoided.

It is evident that the main body of the blow molding piston has in this case three portions 28a, 28b and 28c of different cross-sections which are attached to one another. In particular, the middle portion 28b has a larger cross-section than the two portions 28a and 28c attached in each case to this middle portion. The connecting lines 22 extend for the most part in the portion 28b with the enlarged cross-section, but also sectionally in the portion 28c. It is further evident that the openings 22a of the connecting lines are situated in a transition area between the first portion 28a and the second portion 28b. In addition, these openings have at least in part an elliptical, elongate or kidney-shaped profile in this case. In addition, it is evident that the cross-sections of the openings extend in two planes which are at an angle to each other, and in particular in this case at a right angle to each other.

The reference 36a (FIG. 4) designates a portion of the cavity 36 with an enlarged cross-section. The individual connecting lines open into this portion 36a. In this way, a further collecting space for the gaseous medium, which is situated, however, downstream of the connecting lines 22 in the flow direction of the gaseous medium used for the expansion of the plastics material preform, is formed in this portion 36a.

The Applicants reserve the right to claim all the features disclosed in the application documents as being essential to the invention, insofar as they are novel either individually or in combination as compared with the prior art.

LIST OF REFERENCES 1 transforming stations
2 blow molding nozzle
6 stretching rod
8 valve block
10 plastics material preform
10a plastics material containers
12 conveying star wheel
14 blow molding piston
18 annular channel or annular space respectively 22 connecting lines/air channels
22a supply opening
22b lower opening
25 collecting portion
28 main body
28a, b, c portion of the main body
32 supply device
34 removal device
36 cavity
36a portion of the cavity
38 valve device
42 guide sleeve
44 seal
46 further guide device
50 arrangement
64, 66 lateral parts
68 locking device
70 drive
114 blow molding piston
120 cap
122 connecting line
123 second portion
P conveying path
L longitudinal direction
S flow path
a angle

The invention claimed is:

1. An apparatus (1) for the transforming of plastics material preforms (10) into plastics material containers with a blow molding nozzle (2) arranged on a blow molding piston (14) extending in a predetermined longitudinal direction (L), in order to act upon these plastics material preforms with a gaseous medium for the expansion thereof, with an attachment device in order to supply the gaseous medium to the blow molding nozzle (2), and with at least one connecting line (22), which conveys the gaseous medium from the attachment device to the blow molding nozzle, wherein at least one portion of this connecting line (22) extends obliquely with respect to the longitudinal direction, the at least one connecting line leading to a cavity (36) by way of an elliptical, elongated or kidney-shaped opening, the blow molding piston further comprising a guide sleeve through which a rod-like body is capable of being received and guided, the guide sleeve inserted into the blow molding piston.

2. The apparatus (1) according to claim 1, wherein the portion of this connecting line extends at an angle with respect to the longitudinal direction (L), which is between 5° and 70°.

3. The apparatus (1) according to claim 1, wherein the portion extends in a straight line.

4. The apparatus (1) according to claim 1, wherein the apparatus has a rod-like body (6) which is capable of being introduced into the plastics material preforms and which is passed through at least one portion of the blow molding nozzle and/or the blow molding piston (14).

5. The apparatus (1) according to claim 1, wherein the apparatus has a plurality of connecting lines (22), which convey the gaseous medium from the attachment device to the blow molding nozzle.

6. The apparatus according to claim 5, wherein the connecting lines (22) are arranged in a circumferential direction around a longitudinal axis L) of the blow molding piston (14).

7. The apparatus (1) according to claim 5, wherein the connecting lines (22) have in each case inlet openings (22a), and an annular space (18) is provided, which supplies these inlet openings (22a) with the gaseous medium.

8. The apparatus (1) according to claim 1, wherein the apparatus (1) has at least one valve (38) in order to control the supply of the gaseous medium by way of the connecting lines (22).

9. The apparatus (1) according to claim 8, wherein the valve (38) is capable of being associated in flow connection with the connecting lines (22) at least indirectly, wherein a cross-sectional area of these connecting lines (22) is at least as large as a cross-sectional area of the supply line (39) and/or wherein a cross-sectional area of the connecting lines (22) is larger than or equal to the cross-sectional area of a vent valve.

10. The apparatus according to claim 8, wherein a cross-sectional area of these connecting lines (22) is larger than a cross-sectional area of a feed line or a discharge line.

11. The apparatus according to claim 4, wherein a guide body is arranged between the rod-like body and the blow molding piston (14).

12. A blow molding piston (14) for acting upon plastics material preforms (10) with a gaseous medium, with a main body (28), which has in the interior thereof a continuous cavity (36), which extends in a longitudinal direction (L) of the blow molding piston (14) and through which a rod-like body is capable of being guided, as well as a plurality of connecting lines (22) which are suitable for conveying a gaseous medium, wherein each of these connecting lines (22) is arranged around the cavity (36) in a circumferential direction of the main body and extends obliquely with respect to the longitudinal direction (L), the at least one connecting line leading to a cavity (36) by way of an elliptical, elongated or kidney-shaped opening, the blow molding piston further comprising a guide sleeve for guiding and receiving a rod-like body, the guide sleeve inserted into the blow molding piston.

13. The apparatus of claim 2 wherein the angle at which this connecting line extends with respect to the longitudinal direction (L) is between 5° and 50°.

14. The apparatus of claim 2 wherein the angle at which this connecting line extends with respect to the longitudinal direction (L) is between 5° and 40°.

15. The apparatus of claim 1 wherein the oblique extension of the connecting line is from an annular space, said annular space providing the connecting line with the gaseous medium and said annular space is directly connected with the attachment device.

16. The apparatus of claim 1 wherein at least one connecting line is free from bends.

17. The apparatus of claim 1 wherein at least one connecting line comprises at least one bend, said bend not exceeding an angular dimension of more than 60°.

18. The apparatus of claim 1 wherein at least one connecting line comprises at least one bend, said bend not exceeding an angular dimension of more than 40°.

19. The apparatus of claim 1 wherein at least one connecting line comprises at least one bend, said bend not exceeding an angular dimension of more than 30°.

20. The apparatus of claim 5 wherein the connecting lines extend uniformly obliquely.

21. The apparatus of claim 1 wherein the connecting lines form a tapered shape enlarged in a direction away from the plastics material preforms.

22. The apparatus of claim 4 wherein the blow molding piston comprises an interior cavity wherein openings of the connecting lines lead to the cavity, said cavity capable of receiving the rod-like body.

23. The apparatus of claim 1 wherein the guide sleeve comprises a plastic material.

24. The apparatus of claim 4 wherein the rod-like body comprises steel and is capable of being positioned in such a way that the guide sleeve prevents the blow molding piston and the rod-like body from resting against each other.

25. An apparatus (1) for the transforming of plastics material preforms (10) into plastics material containers with a blow molding nozzle (2) arranged on a blow molding piston (14) extending in a predetermined longitudinal direction (L), in order to act upon these plastic material preforms with a gaseous medium for the expansion thereof, with an attachment device in order to supply the gaseous medium to the blow molding nozzle (2) and with at least one connecting line (22), which conveys the gaseous medium from the attachment device to the blow molding nozzle, wherein at least one portion of the connecting line (22) extends obliquely with respect to the longitudinal direction, the blow molding piston further comprising a guide sleeve through which a rod-like body is capable of being received and guided, the guide sleeve inserted into the blow molding piston, the blow molding piston further comprising a cavity (36), the cavity (36) comprising a portion (36*a*) into which at least one connecting line opens, a collecting space for the gaseous medium situated downstream of the least at least one connecting line, the connecting lines leading to cavity (36) by way of an elliptical, elongated, or kidney-shaped opening.

26. The apparatus of claim 25 wherein the portion (36*a*) of the cavity (36) has an enlarged cross-section.

27. The apparatus of claim 6, wherein the connecting lines are arranged in a star-shaped circumferential direction around the longitudinal axis (L) of the blow molding piston (14).

28. The apparatus of claim 12, wherein each of the connecting lines (22) are arranged around the cavity (36) in a star-shaped circumferential direction of the main body.

* * * * *